Dec. 4, 1962 V. L. COLORIGH 3,066,956
TRACTOR LOAD BED WITH FIFTH WHEEL RAISABLE
FROM BED LEVEL POSITION
Filed June 13, 1961
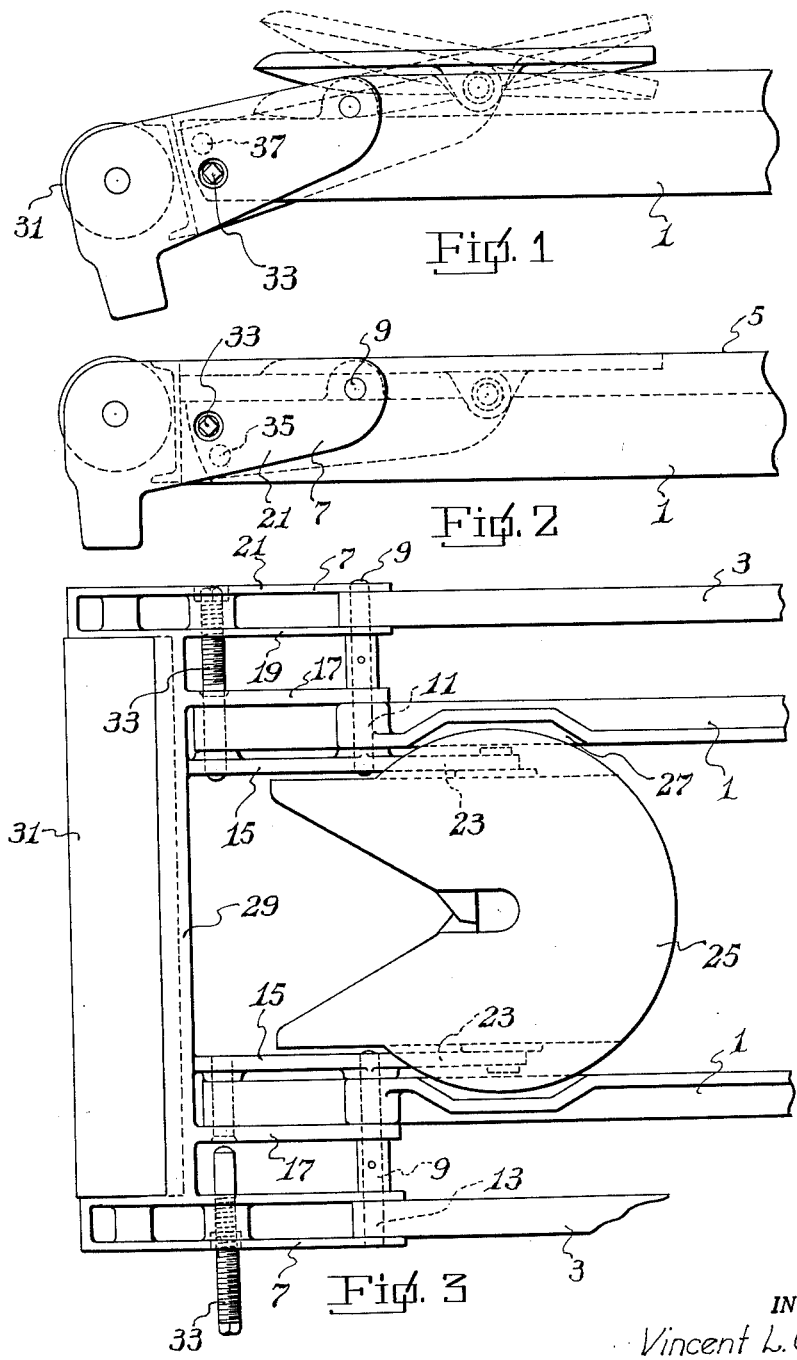
INVENTOR.
Vincent L. Colorigh
BY
Robert J. Patch
ATTY.

United States Patent Office 3,066,956
Patented Dec. 4, 1962

3,066,956
TRACTOR LOAD BED WITH FIFTH WHEEL RAISABLE FROM BED LEVEL POSITION
Vincent L. Colorigh, 8345 E. 5th Place, Tulsa, Okla.
Filed June 13, 1961, Ser. No. 116,723
3 Claims. (Cl. 280—438)

The present invention relates to vehicle structure, and more particularly to vehicle structure associated with the fifth wheel of a traction vehicle.

Conventional traction vehicles provided with a fifth wheel are useful only as such. Thus, during periods when they are moving but are not drawing a trailer, they are performing no useful function. Often, after drawing a trailer for a long distance, they must deadhead back at considerable wasted expense.

Accordingly, it is an object of the present invention to provide vehicle structure which enables conversion of a traction vehicle having a fifth wheel to a vehicle having an unobstructed article-supporting bed, and vice versa.

Other objects and advantages of the present invention will become apparent from a consideration of the following description, taken in connection with the accompanying drawing, in which:

FIGURE 1 is a fragmentary side elevational view of structure according to the present invention, showing the fifth wheel in its upper position;

FIGURE 2 is a view similar to FIGURE 1 but showing the fifth wheel in its lower position; and FIGURE 3 is a plan view of the structure shown in FIGURES 1 and 2.

Referring now to the drawing in greater detail, there is shown structure at the rear of a vehicle, comprising a pair of horizontal inner beams 1 which extend rearwardly from the vehicle proper and terminate at the rear of the vehicle, and a pair of horizontal outer beams 3 parallel to each other and to inner beams 1 but shorter than beams 1. It is of course understood that beams 1 and 3 are secured in the usual manner to the vehicle frame in rigid unitary assembly therewith. The upper surfaces of beams 1 and 3 thus provide a horizontal vehicle bed as indicated at 5.

A frame 7 is mounted on beams 1 and 3 for vertical swinging movement about a horizontal axis disposed intermediate its length and perpendicular to the direction of travel of the vehicle. Frame 7 pivots on axially aligned pintles 9 which in turn are received through holes 11 in inner beams 1 spaced a distance forward of the rear ends of beams 1, and holes 13 in outer beams 3 at the rear ends thereof. Frame 7 includes a plurality of bars parallel to the length of the vehicle and its direction of travel, comprising innermost bars 15 each on the inner side of its associated inner beam 1, next outer bars 17 each on the outer side of its associated inner beam 1, next outer bars 19 each on the inner side of its associated outer beam 3, and outermost bars 21 each on the outer side of its associated outer beam 3. These four pairs of bars are in rigid unitary assembly with each other in the frame. They all extend from pintles 9, which pass through them, to the rear, except for bars 15, which in addition to extending to the rear also extend forward and carry between them at their forward ends a conventional fifth wheel 25, which, however, is mounted for pivotal movement on the forwards ends of bars 15 about a second horizontal axis parallel to the first mentioned horizontal axis and disposed below and intermediate the ends of and fixed relative to fifth wheel 25.

The fifth wheel is thus vertically swingable bodily about the common axis of pintles 9 between an upper position in which its upper surface is spaced a substantial distance above the upper surface of vehicle bed 5 and a lower position in which its upper surface is not substantially above the upper surface of vehicle bed 5, and in the illustrated embodiment is flush therewith. In the upper position, the fifth wheel is oscillatable about its subjacent said second axis relative to frame 7; and this feature has utility so that the fifth wheel may be moved from the dotted line position shown in FIGURE 1 to the full line position shown therein when in raised position, thereby better to accommodate attachment with the coacting coupling of a trailing vehicle (not shown). In its lower position, however, it is intended that the fifth wheel serve merely as a continuation of the article-supporting surfaces of the vehicle bed. Any tilting of the fifth wheel would be inconsistent with this purpose; and hence, provision is made for fixing the fifth wheel against swinging movement relative to frame 7. To this end, the upper surfaces of inner beams 1 are recessed as at 27 to a depth equal to the thickness of the marginal edges of fifth wheel 25, so that when the fifth wheel is brought down to its lowermost position, it will seat in these recesses and be held against tilting movement relative to frame 7 and at the same time have its upper surface flush with the upper surface of vehicle bed 5. Hence, the surfaces of the recesses at 27 which contact the fifth wheel are horizontal and uniplanar to maintain the fifth wheel horizontal.

A transverse channel beam 29 extends across the rear of frame 7, and a roller 31 is mounted rearwardly thereof on the frame for rotation about its axis relative to the frame. The axis of rotation of the roller comprises a third axis parallel to the first and second axes described above. It is particularly to be noted that the space between innermost bars 15 rearwardly of fifth wheel 25 is open except for transverse beam 29 and roller 31. Hence, when fifth wheel 25 is in raised position as in FIGURE 1, beam 29 and roller 31 are correspondingly depressed so as to clear the path for a trailer coupling to engage with the fifth wheel from the rear of the traction vehicle. But when the fifth wheel is in its lower position, beam 29 and roller 31 are in raised position and the upper surfaces of frame 7 are horizontal and coplanar with the upper surfaces of vehicle bed 5 and fifth wheel 25 thereby to provide in effect a continuation of the article-supporting surfaces of the vehicle bed and fifth wheel. In this raised position of the rear of the frame, roller 31 projects a short distance above the common plane of the upper surfaces of bed 5, frame 7 and wheel 25 and assists in the loading of articles onto and the removal of articles from the article-supporting surfaces thus provided.

If desired, the article-supporting surfaces may be rendered more continuous by providing metal plates (not shown) on top of the inner and outer beams 1 and 3, recessed for receiving fifth wheel 25. In that case, the upper surface of fifth wheel 25 in its lower position is flush with the upper surface of those metal plates and the upper edges of frame 7 in that lower position of wheel 25 are coplanar with the upper surface of the metal plates. The metal plates then are a portion of the vehicle bed 5.

It will thus be seen that the movable parts of the present invention have two operative positions: the first as shown in FIGURE 1 and the second as shown in FIGURE 2. Means are provided for releasably securing the movable parts in either of these positions, including a pair of opposed locking pins 33 one on either side of the frame and having screw-threaded engagement in interiorly screw-threaded holes through bars 19 and 21 on each side of the frame and extending inwardly toward each other in axial alignment with each other parallel to the three axes mentioned above and having smooth inner ends selectively slidably receivable in either of a pair of opposed vertically spaced holes 35 and 37 extending through inner beams 1. To fix the movable parts in either of their operative positions, locking pins 33 are unscrewed outwardly of the frame to the position shown at the bottom of FIGURE 3 and the frame is swung until the pins are aligned with the desired holes 35 or 37. If it is desired to fix the parts in the position shown in FIGURE 1, the pins are aligned with holes 35, and if in the position of FIGURE 2 the pins are aligned with holes 37. With the pins aligned as desired, they are then screwed inwardly toward each other through the selected holes from the positions shown at the bottom of FIGURE 3 to the position shown at the top of FIGURE 3 in which they extend through and are held stationary by inner beams 1.

From a consideration of the foregoing, it will be obvious that all of the initially recited objects of the present invention have been achieved.

It is to be understood that the appended claims are to be accorded a range of equivalents commensurate in scope with the advance made over the prior art.

What is claimed is:

1. In a traction vehicle having a fifth wheel adapted to be releasably interconnected with a coupling of a trailing vehicle to complete an articulated connection between the traction and trailing vehicles, the improvement comprising a horizontal vehicle bed carried by the traction vehicle and extending on either side of the fifth wheel, a frame pivotally mounted on the traction vehicle for vertical swinging movement about a horizontal axis disposed transversely of the direction of movement of the traction vehicle and extending forward and rearward of said axis in the direction of movement of the traction vehicle, the fifth wheel being mounted on the frame forward of said axis for vertical movement relative to the vehicle bed between a lower position in which the upper surface of the fifth wheel is disposed substantially no higher than the upper surface of the vehicle bed and an upper position in which the upper surface of the fifth wheel is disposed substantially higher than the upper surface of the vehicle bed, a roller mounted on the frame rearward of said axis for rotation about a second axis parallel to the first-mentioned axis and for vertical movement relative to the vehicle bed between a lower roller position when the fifth wheel is in its said upper position and the roller is out of the way of a coupling of a trailing vehicle, and an upper roller position when the fifth wheel is in its said lower position and the roller so disposed as to aid in the loading of articles onto and the unloading of articles from the vehicle bed, and means engageable with the frame releasably to secure the roller and fifth wheel in either of their said positions relative to the vehicle bed.

2. Apparatus as claimed in claim 1, and means pivotally interconnecting the fifth wheel and the frame for vertical swinging movement of the fifth wheel relative to the frame about a third horizontal axis underlying and fixed relative to the fifth wheel and parallel to said first and second axes.

3. Apparatus as claimed in claim 2, and means holding the fifth wheel against vertical swinging movement about said third axis in said lower position of the fifth wheel.

References Cited in the file of this patent

UNITED STATES PATENTS

| | | |
|---|---|---|
| 1,568,168 | Land | Jan. 5, 1926 |
| 2,515,575 | Van Langen | July 18, 1950 |
| 2,676,033 | Housh et al. | Apr. 20, 1954 |
| 2,749,144 | Kayler | June 5, 1956 |

FOREIGN PATENTS

| | | |
|---|---|---|
| 1,235,509 | France | May 30, 1960 |